Jan. 25, 1955
J. J. SCOTT
2,700,579
BEARING OF INTEGRAL ASSEMBLY TYPE
Filed June 29, 1951
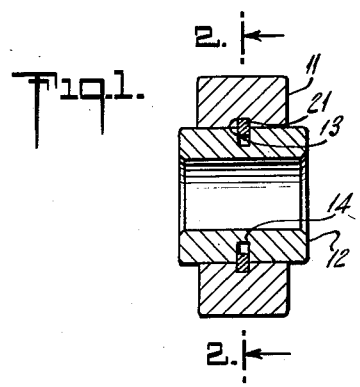
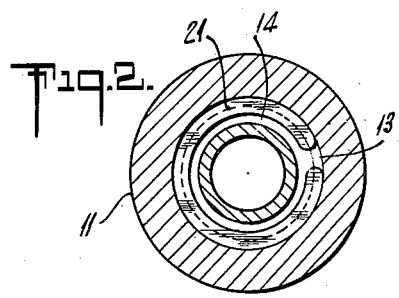
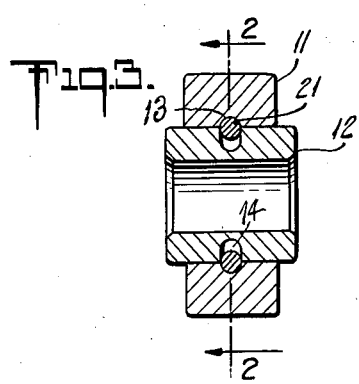
INVENTOR.
JAMES J. SCOTT
BY
ATTORNEY.

United States Patent Office 2,700,579
Patented Jan. 25, 1955

2,700,579

BEARING OF INTEGRAL ASSEMBLY TYPE

James J. Scott, North Plainfield, N. J., assignor to Bound Brook Oil-Less Bearing Company, Bound Brook, N. J., a corporation of New Jersey Application June 29, 1951, Serial No. 234,275

2 Claims. (Cl. 308—121)

This invention relates to bearings especially adapted for ball bearing replacement, and has for its object the production of an integral assembly of two bearing races and at the same time provides a simple unitary construction that will overcome the inherent weakness of the ball bearing for which it is designed to replace, with the addition to produce a bearing that will carry heavier live loads size for size, at the same time run cooler under loads.

Bearing manufacturers have, for a long period of time, been attempting to develop a design of bearing with the same overall dimension and outline of a ball bearing to be used as a direct replacement. Solid slugs of powdered material have been suggested because of greater load carrying capacity but this offers difficulties when absorbing thrust loads.

When self-lubricating bearing replacements are offered, the problem has been made more acute by the United States Air Force directive requiring that self-lubricating bearings have a groove surrounding the bearing filled with additional lubrication but this is not considered good design on air craft because of stress concentrations.

I have discovered that when a replacement bearing is constructed solely of two unitary races assembled and held integral by a snap ring, the result has the load carrying capacity of the single slug and in addition to lubricating properties produce a much cooler running bearing because the snap ring will operate the same way as an oil ring does in a conventional sleeve bearing motor assembly, and redistribute the lubricant contained in the slot which accommodates the snap ring.

The foregoing and other features of this invention will now be described in connection with the accompanying drawing forming part of this specification in which I have illustrated my ball bearing replacement bearing in its preferred form, after which I shall point out in the claims those features which I believe to be new and of my own invention.

In the drawings:

Figure 1 is a longitudinal cross-section through a typical bearing replacement embodying my invention.

Figure 2 is a cross-section along the line 2—2, both in Figures 1 and 3.

Figure 3 is a section similar to that shown in Figure 1 showing a modification which I may employ.

In the carrying out of my invention I provide two races 11 and 12. Race 11 is provided with an internal annular groove 13, while race 12 is provided with an angular groove 14 in the outer perimeter of the race body. To hold these two races together I provide a snap ring 21, which fits into the annular space formed by the grooves 13 and 14. These grooves 13 and 14 and the cross-section of the split snap ring should be sized to conform so that in assembling the two races together in an integral whole, the groove 14 is deep enough to permit the snap ring to be wholly embraced within the race 12 permitting the outer race to slide into position as shown in Figures 1 and 3. With the groove 13 in the race 11 filled with lubricant during assembly when the snap ring expands holding the races together the lubricant is transferred to the groove 14. As the bearing turns in operation the snap ring serves as an oil ring redistributing the lubricant around in the groove.

Running tests with this bearing show most unusual and unexpected results. Tests were made at PV factors of approximately 50,000. The PV factor is a common term in the bearing art and refers to the product of P, the load on the bearing in pounds per square inch of projected area times V, the velocity in feet per minute of the bearing surfaces with respect to each other. In these tests, temperatures were only 120°–135° F. after a run of 150 hours, whereas with standard bearing the temperatures run over double the temperature approximating 250°–300° F. with some failures. As it is impossible to take this bearing apart no inspection could be made for wear and/or abrasion. From outward appearance, however, there was no wear or deterioration.

I have discovered that an open type snap ring of round cross-section is best suited for the purpose because with this section danger of scratching or scraping is avoided during assembly. This snap ring not only serves to take up side thrusts but it also acts the same way an oil ring does in a sleeve bearing motor. I may find in some cases that a rectangular section ring is necessary when much greater side thrust is required, although the round section will stand 600 pounds before deforming the race track in composition races.

It will be readily understood that my races may be made out of any bearing material, solid metal or porous material and I may contemplate the use of dry lubricant in which event the lubricant may be compacted in the porous material of the bearing.

It is also important to understand that the outline shown in the drawings is only for purpose of illustration purposes and that the shape may be many shapes following the outline of the ball bearing for which it is designed to replace.

To assemble the ball bearing replacement, the following steps should be followed:

1. Insert snap ring into groove in inner race which is machined deeper than cross section of ring.
2. Place sleeve of same dimensions as outer race, except for throat to pick up snap ring, ahead of outer race. Press over inner race depressing snap ring completely into inner race groove.
3. Continue (2) above by following up with outer race and when the groove in outer race is over snap ring, it will snap into groove in outer race, making a one-piece assembly.

I wish it distinctly understood that my bearing herein described and illustrated is in the form in which I desire to construct it and that changes or variations may be made as may be desirable or convenient without departing from the salient features of my invention and I therefore intend the following claims to cover such modifications as naturally fall within the lines of invention.

I claim:

1. A bearing, comprising inner and outer, concentric, relatively rotatable members having closely engaging bearing surfaces of circular cross-section perpendicular to their axis of rotation, said members having opposed grooves in said surfaces intermediate the ends thereof, said grooves being of unequal depth, a snap ring having a thickness in the radial direction greater than the depth of the shallower groove and smaller than the depth of the deeper groove, said ring having an inner diameter in its unstressed condition greater than the diameter of the bottom of the groove on the inner member, said ring being received in said grooves so that it extends radially into both grooves, said grooves and said ring having substantially equal widths, so that said ring is effective to prevent relative endwise movement of the members, and lubricant in said grooves, said ring being rotatable in said grooves relative to said members to distribute the lubricant around the peripheries of said members, said ring being deformable from said unstressed condition to a contour in which it is completely receivable within said deeper groove so as to permit the relative endwise movement of the members required for assembly thereof.

2. A bearing as defined in claim 1, in which at least one of the elements is composed of porous powdered material, and is effective to retain a quantity of lubricant serving as a supply of lubricant to said grooves.

References Cited in the file of this patent

UNITED STATES PATENTS

| | | |
|---|---|---|
| 1,061,603 | Foust | May 13, 1913 |
| 1,505,913 | Wornock | Aug. 19, 1924 |
| 2,035,519 | Apple | Mar. 31, 1936 |
| 2,112,325 | Bentzinger | Mar. 29, 1938 |
| 2,137,434 | Wood | Nov. 22, 1938 |
| 2,192,697 | Scott | Mar. 5, 1940 |
| 2,393,203 | Tarbell | Jan. 15, 1946 |
| 2,635,931 | May | Apr. 21, 1953 |